(12) United States Patent
Fischer et al.

(10) Patent No.: US 6,746,124 B2
(45) Date of Patent: Jun. 8, 2004

(54) FLASHLIGHT PRODUCING UNIFORM HIGH BRIGHTNESS

(76) Inventors: Robert E. Fischer, 5717 Stone Mountain Ln., Westlake Village, CA (US) 91362; David Kappel, 13524 Rostrata Rd., Poway, CA (US) 92064; Greg Moeller, 6857 N. Tulane, Moorpark, CA (US) 93021

( * ) Notice: Subject to any disclaimer, the term of this patent is extended or adjusted under 35 U.S.C. 154(b) by 90 days.

(21) Appl. No.: 10/068,366

(22) Filed: Feb. 5, 2002

(65) Prior Publication Data

US 2002/0118344 A1 Aug. 29, 2002

Related U.S. Application Data

(60) Provisional application No. 60/266,589, filed on Feb. 6, 2001.

(51) Int. Cl.[7] .................. G03B 29/00; G03B 21/14; G03B 21/22; F21L 4/00; F21V 7/00
(52) U.S. Cl. ............. 353/43; 353/20; 353/102; 353/119; 362/187; 362/188; 362/347
(58) Field of Search ................ 353/43, 20, 30, 353/34, 37, 97, 121, 122, 102, 119; 362/187, 188, 157, 347

(56) References Cited

U.S. PATENT DOCUMENTS

| | | | |
|---|---|---|---|
| 3,656,845 A | * 4/1972 | Koch-Bossard et al. | 353/42 |
| 5,461,552 A | 10/1995 | Tillery | 362/188 |
| 5,560,705 A | 10/1996 | Shiau | 362/188 |
| 5,625,738 A | 4/1997 | Magarill | 385/146 |
| 5,630,661 A | * 5/1997 | Fox | 362/187 |
| 5,865,525 A | 2/1999 | Kibler et al. | 362/187 |
| 6,045,236 A | 4/2000 | Cheng et al. | 362/188 |
| 6,048,084 A | 4/2000 | Sedovic et al. | 362/347 |
| 6,206,549 B1 | 3/2001 | Li | 385/297 |
| 6,260,974 B1 | * 7/2001 | Koyama | 353/98 |
| 6,283,609 B1 | 9/2001 | Parsons et al. | 362/187 |
| 6,318,863 B1 | * 11/2001 | Tiao et al. | 353/31 |
| 6,337,946 B1 | 1/2002 | McGaffigan | 385/901 |
| 6,394,116 B1 | * 5/2002 | Winn et al. | 135/65 |
| 6,431,732 B1 | * 8/2002 | Brown et al. | 362/259 |
| 6,439,723 B1 | * 8/2002 | Tano | 353/15 |
| 6,464,358 B1 | * 10/2002 | Shirakura et al. | 353/7 |
| 2001/0043313 A1 | * 11/2001 | Okura | 353/97 |
| 2002/0159260 A1 | * 10/2002 | Ebersole | 362/339 |

\* cited by examiner

*Primary Examiner*—David Gray
*Assistant Examiner*—Melissa J Koval

(57) ABSTRACT

A flashlight that generates a flashlight beam to illuminate an object at a selectable distance from the flashlight by imaging a uniformly bright pattern of light onto the object. A light modifying component can be used to manipulate the pattern of light into particular shapes and images. In one embodiment, light from a light source is coupled into a light pipe. The light is homogenized as it travels along the light pipe. The light exits the light pipe with a more uniform intensity than when it entered. The light exiting the light pipe is then reimaged by an imaging lens onto an object. Yet in other embodiments, one or more lens arrays having two or more lenlets are used to homogenize the light originating from the light source.

25 Claims, 2 Drawing Sheets

FLASHLIGHT PRODUCING UNIFORM HIGH BRIGHTNESS

CROSS-REFERENCE TO RELATED APPLICATIONS

This applications claims priority to U.S. Provisional Application No. 60/266,589, filed Feb. 6, 2001, which is incorporated herein by reference.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to an optical system and associated mechanics for a flashlight providing a heretofore-unachievable level of performance.

2. Description of the Related Art

The flashlight was invented in 1898 by Conrad Hubert who turned a metal tube, a light bulb and a battery into the world's first flashlight. Little has changed in flashlight technology until now with this invention.

Today's flashlight technology is based on locating a tungsten lamp or bulb at the focus of a parabolic reflector and simply imaging the filament out into object space. The reflector may be of other shapes and may be faceted or otherwise modified. At a somewhat distant wall (such as at a distance of 3–6 feet for example) a crude image of the filament will be formed.

A significant problem with the current technology is that the image of the filament is generally a crude image or spot which varies significantly in its intensity. While some flashlights permit the user to vary or adjust the size of the pattern, it is generally highly non-uniform in intensity. Another problem is that the light spills out to a wide area outside of the intended spot area.

Another problem is that with the inherent non-uniformity of the spot as discussed above, it makes it difficult in many circumstances to see clearly the object of interest. This is because the variation in intensity can often mask or hide the features of the object of interest.

Another problem is that the illuminated area with prior art flashlights is unattractive. Most illumination in homes and offices for example provide reasonably uniform brightness and we are generally use to such uniformity in brightness.

BRIEF SUMMARY OF THE INVENTION

One or more of the problems outlined above may be addressed by the various embodiments of the invention. Broadly speaking, techniques according to the invention use a light homogenization method to provide a uniform pattern of light on an object. The pattern of light appears uniform in brightness to the eye, and, particularly with those embodiments using a light pipe, the pattern of light has a very sharp edge defining its shape, much like a theater spotlight. Certain embodiments of the invention provide a higher level of light or photon efficiency than prior art technology flashlights in addition to providing the bright uniform pattern of light. In addition, a light modifying component can be used to manipulate the pattern of light into particular shapes and images.

In one embodiment, a light source according to an embodiment of the invention projects light into an input face of a light pipe. The light travels along the light pipe reflecting off its walls such that the light exiting the output face of the light pipe is homogenized, and of a more uniform intensity that the light which entered at the input face. A lens is used to reimage the uniform light exiting the output face onto the object or area of interest. The light sources which may be used include: common flashlight bulbs, light emitting diodes, arc lamps and the like. Light directing devices such as elliptical reflectors, diffusers and the like, may be used to channel light from the light source into the light pipe. Light pipes can be solid or hollow, can be tapered or uniform, or can be a compound parabolic concentrator, or the like. Light modifying components can be used in the system to create patterns and display images and include masks, films, transparencies and the like.

Other embodiments accomplish light homogenization using lens arrays to achieve a uniform pattern of light. Such lens arrays can be used alone or in a series to diffuse an original uneven light projection into a resulting more uniform pattern of light. As the number of lens arrays used, and/or the number lenslets used in such lens arrays are increased, the greater the amount of resulting homogenization is generally achieved.

BRIEF DESCRIPTION OF THE SEVERAL VIEWS OF THE DRAWINGS

A better understanding of the present invention can be obtained when the following detailed descriptions of the disclosed embodiments are considered in conjunction with the following drawings, in which.

DETAILED DESCRIPTION OF THE INVENTION

Figure 1:
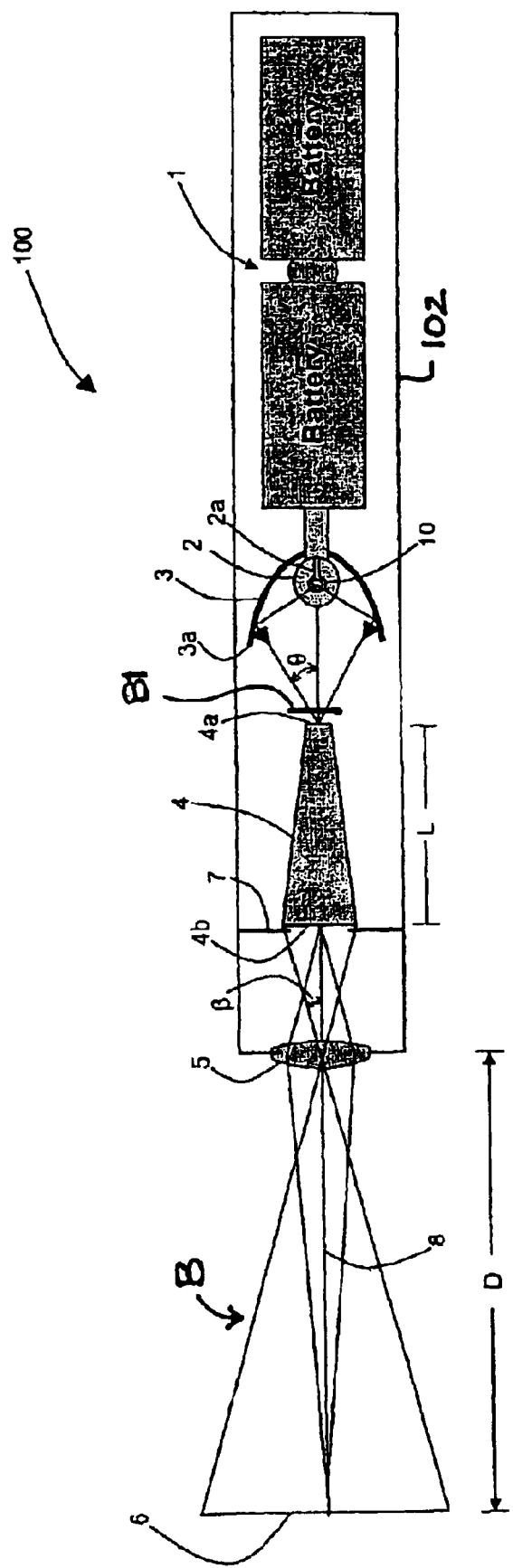
FIG. 1 is component diagram showing a side view of an embodiment having a light pipe and showing the path of the light as it travels through the embodiment.

FIG. 1 is a schematic diagram of an example embodiment of a flashlight 100 according to the present invention. Flashlight 100 includes a housing 102, which in an example embodiment is a hand-held housing such as those used with conventional flashlights. Housing 102 houses the various elements (described in detail below) that constitute flashlight 100.

Two ordinary flashlight batteries 1 are shown in flashlight 100 of FIG. 1, but any number of batteries (i.e. one or more), or types of batteries, or any applicable power source will work as a power source for a conventional or ordinary flashlight bulb 2. The bulb 2 is located nominally at one focus 10 of an elliptical reflector 3 as shown. Instead of reflecting the light out directly from an elliptical reflector to the object or wall 6 as with prior art flashlights (not shown), where all the light from elliptical reflector is directed along a path substantially parallel to the optic axis, this embodiment of a flashlight 100 uses the same bulb filament 2a, but, reimages the light via an elliptical reflector 3 into the input aperture or input face 4a of a tapered light pipe 4. To achieve this redirection into input face 4a, the light reflecting off reflector 3, is reflected at various angles to optic axis 8, depending on the particular location doing the reflecting on the elliptical reflector 3, such that all of the reflected light enters light pipe 4 at input face 4a, and where the outer cone angle 0 is defined by the light reflecting from the outer edge 3a into input face 4a. After entering light pipe 4, the light reflects off the walls of light pipe 4 until such reflected light exits light pipe 4 through output aperture or output face 4b. The output from the light pipe is now reimaged by an imaging lens 5 to form a flashlight beam B, which is directed (i.e. focused) by the imaging lens onto the object plane or surface 6 at some distance D in front of the flashlight. If the lens 5 is of reasonable quality, the image of the output of the light pipe 4 will be a sharp and well-defined image of the edge of the light pipe 4. By adjusting the focus of the lens 5, or in other words its location along the optical axis 8, the image of the output of the light pipe 4 can be changed to any desired distance.

One well-known property of a light pipe 4 is that the light exiting the pipe at output face 4b, where the light pipe 4 is sufficient in length L, will be extremely uniform in brightness. This uniform brightness is due to the mixing or homogenization within the light pipe which is a result of multiple reflections within the length of the pipe. Another property of the light pipe 4, being tapered from a small square at the input face 4a to a larger square at the output face 4b, is that the cone angle Ø of light incident will be transformed at the output face 4b so that the included angle of the cone decreases from an angle Ø to an angle β as the output face 4b gets larger than the input face 4a (as shown), or conversely. During this transformation the etendue is preserved. Here, the high numerical aperture of the light cone (meaning a large cone angle Ø) of light incident to input face 4a is reduced in its cone angle to an angle β at the output face 4b in concert with an increase in the area at the output face 4b of the pipe 4. This transformation follows the relationship that the light pipe area times the solid angle of the light cone is constant, whether it is on the entrance side or the exit side. For a non-tapered light pipe (not shown), the numerical aperture entering the light pipe of angle Ø" will be maintained at the exit face of the pipe such that light entering at angle Ø" will be equal to the angle β" at which the light exits the pipe.

Masks 7 of differing shapes and sizes can be located at the output face or surface 4b of the light pipe 4 so as to define, as desired, the shape of the pattern of light at the object 6. Thus a mask 7 could have the shape of a circle, an ellipse, a star, or any other desired shape. As such, the pattern of light can be modified, i.e., made larger, smaller, or have its shape changed, without effecting its uniform properties. Furthermore, any other light modifying component or surface can be located at the output face 4b of the pipe 4 such as an image or picture on a piece of film or transparency, for example, and this would be projected onto the object 6.

The uniqueness of this invention is the ability to take an old technology light source such as an extremely low cost flashlight bulb 2, in combination with a simple reflector 3, and create a flashlight beam B that forms an extremely uniform and bright pattern or disc of light at the object 6 to be viewed. This is in contrast to the prior art type of flashlight, which generates a flashlight beam that forms a very non-uniform patch of light at the object 6. In other words, the flashlight of the present invention provides a flashlight beam having a higher level of uniformity than current flashlights using existing technology flashlight bulbs 2. Flashlight beam non-uniformity (i.e. the inability to uniformly illuminate an object to be viewed with a flashlight) has been one of the common problems of flashlights for many, many years, and through this invention we have finally solved this problem.

There are other embodiments of this invention (none shown) that will be very briefly described below:

The elliptical reflector used to image the bulb filament 2a onto the light pipe 4 can be done with reflectors of other shapes and sizes. Other reflectors include facets or other surface treatments.

The light pipe does not need to be tapered, and in certain embodiments the faces may be of the same size and area. In this situation, the cone angle Ø" incident to the light pipe would be maintained or preserved at the output face of the pipe. Here, angle Ø" would be equal to angle β". Further, the light pipe may take on other shapes other than the square design of the preferred embodiment, such as circular, triangular, rectangular and the like.

In another embodiment of the invention, the image of the bulb filament is defocused from the entrance face of the light pipe. In addition a diffuser 81, which may be a holographic form of diffuser, is located at the entrance face of the light pipe. The combination of the defocused image of the filament and the diffuser at the entrance face of the light pipe produces a larger bright area or patch of light than with a focused filament image and no diffuser. The net result is that the uniformity is improved at the output face of the light pipe because the "kaleidoscoped" light patterns are more filled in than with a focused filament image.

Further, it is possible to take the output of the light pipe and locate or position a circular rod of glass which would act as a solid circular light pipe whose output then would now be imaged to the object.

Another embodiment of the current invention would use a so-called "CPC" or Compound Parabolic Concentrator whose input aperture or face would be located at the focus of the ellipse. The output of the CPC would be a circular disc of light whose cone angles Ø'" are well defined, and could be very easily imaged on to the object. In this embodiment we are simply replacing the tapered light pipe with a CPC.

The light source does not necessarily have to be a filament lamp 2, it could alternatively be a form of light emitting diode or LED, or potentially a laser source which would need to be transformed into a cone of light or otherwise imaged into the input of the light pipe. The source could also be an arc lamp such as a xenon lamp, or any other source of light.

Figure 2:
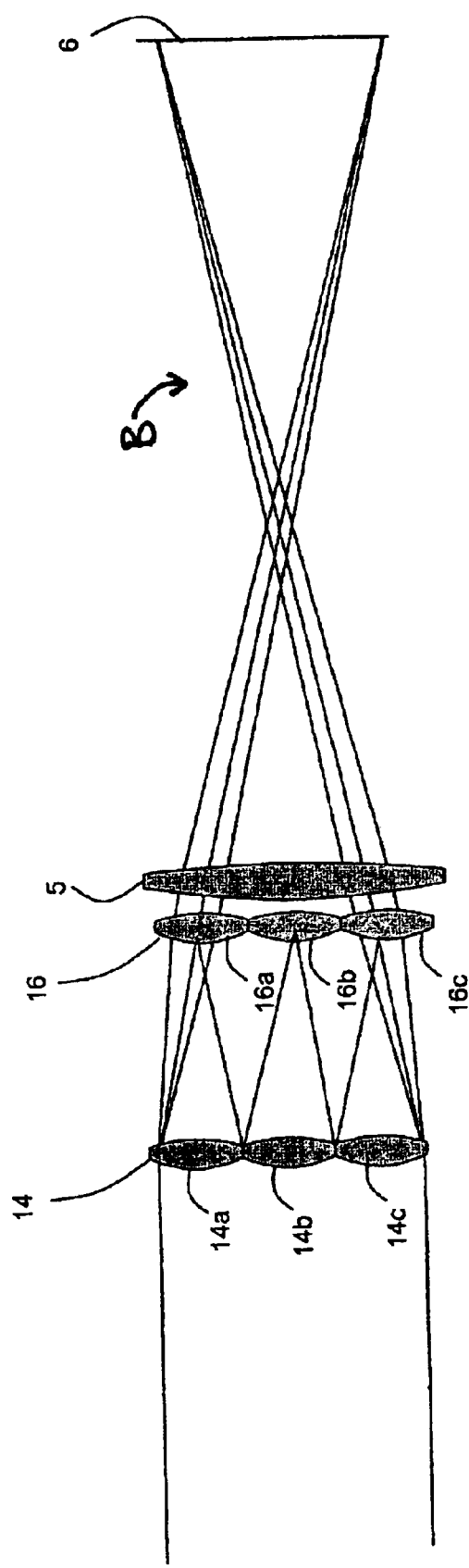
FIG. 2 is an abbreviated component diagram showing a side view of an embodiment having two sets of lens arrays and showing the path of the light as it travels through the embodiment.

Furthermore, as shown in FIG. 2, a uniform pattern of light may also be achieved, i.e., homogenization, by using lens arrays to convert non-uniform light distributions into more uniform light patterns or images. This technique may be used in conjunction with typical non-uniform flashlight output to produce a uniform image. It is also contemplated that existing flashlights could be retrofitted with appropriately designed lens arrays to achieve a more uniform light pattern. Lens arrays 14 and 16, unlike standard lens 5, contain more than one lens, or lenslet 14a–14c, in a single optical medium 14. However, the lenslets need not exist in the same optical medium 14, but need only be located along the path of light extending from the light source. Lens arrays are typically described by the number of lenslets they contain. For example, a 4×4 array is a single optical medium having 16 lenslets arranged 4 high and 4 wide. It is contemplated that lens arrays can be employed in any of the following designs: a single set of lens arrays 14, a pair of lens arrays 14 and 16, or any number of lens arrays. Where such multiple sets of arrays are used, for example a pair of arrays 14 and 16, the first lens array 14 would be used to sample, or receive, the non-uniform output from a light source. Each lenslet 14a–14c of the first array would focus a portion of the beam into the aperture of a second array of lenslets 16a–16c. The elements of the second array image the aperture of the elements of the first array into a uniform pattern of light on a distant plane 6, or where more than two sets of arrays are used 14 and 16, the last set of lens arrays 16 perform the final imaging before standard lens 5 focuses the reimaged light on object 6. Regardless of the number of arrays used, the resulting image at the particular plane or object 6 is the product of the superposition of multiple images. By using lens arrays 14 and 16 it is possible to zoom the size of the distant plane 6 by moving the lens arrays 14 and 16 relative to one another. It is contemplated that such relative movement of multiple lens arrays allows the size of the image to be increased by up to at least a factor of three.

Although the disclosed embodiments may be directed to flashlight designs, such disclosures and descriptions may also be applied to many other applications where a uniform or more sharply defined illumination pattern is beneficial, including, but not limited to, headlights in automobiles, trucks, motorcycles, or other motorized vehicles, or bicycles, desk lamps or practically any other lighting or illumination device or application.

The foregoing disclosure and description of the various embodiments are illustrative and explanatory thereof, and various changes in the components, component configurations, component combinations, circuit elements, circuit configurations, and resulting light paths, as well as in the details of the illustrated circuitry, components and construction and method of operation may be made without departing from the spirit and scope of the invention.

We claim:

1. A flashlight for uniformly illuminating an object to be viewed, comprising:
    a light source;
    a light homogenizer arranged to receive light from the light source at an input face and adapted to output uniformized light at an output face, wherein the light homogenizer includes i) a light pipe or ii) one or more lens arrays; and
    an imaging lens arranged adjacent the output face and at an output end of the flashlight to create a flashlight beam that forms an image of the output face at a distance from the output end of the flashlight so as to uniformly illuminate the object when the object is located at said distance.
2. The flashlight of claim 1, further comprising:
    a reflector adapted to reflect light from the light source towards the input end of the light homogenizer.
3. The flashlight of claim 2, wherein the reflector is an elliptical reflector.
4. The flashlight of claim 1, wherein the light source is one selected from the group of light sources comprising: a conventional flashlight bulb, a light emitting diode, a laser, and an arc lamp.
5. The flashlight of claim 1, further including one or more batteries connected to the light source to power the light source.
6. The flashlight of claim 5, further including a hand-held housing that houses the light source, the light homogenizer, the imaging lens and the one or more batteries.
7. The flashlight of claim 1, wherein imaging lens is adjustable relative to the output face to adjust the distance at which the uniform illumination is formed.
8. The flashlight of claim 1, further comprising
    a light modifying component arranged at the output face of the light homogenizer.
9. The flashlight of claim 8, wherein the light modifying component is a mask.
10. The flashlight of claim 8, wherein the light modifying component is a film.
11. The flashlight of claim 1, wherein the input face has a smaller area than the output face.
12. The flashlight of claim 1, wherein the input face and the output face have substantially the same area.
13. The flashlight of claim 1, further comprising a diffuser.
14. The flashlight of claim 1, wherein the light homogenizer is a hollow light pipe.
15. The flashlight of claim 1, wherein the light homogenizer is a solid light pipe.
16. The flashlight of claim 15, wherein the solid light pipe is a circular rod of glass.
17. The flashlight of claim 1, wherein the light homogenizer is a lens array that includes lenslets.
18. The flashlight of claim 1, wherein the light homogenizer comprises two lens arrays each having lenslets.
19. A method of forming a flashlight beam to uniformly illuminate an object at a selectable distance from the flashlight comprising:
    generating light from a light source;
    homogenizing the light by passing the light through a light homogenizer that includes i) a light tunnel or ii) one or more lens arrays;
    receiving the homogenized light from an output face of the light homogenizer with an imaging lens; and
    using the imaging lens, focusing the received light as a flashlight beam to form a uniform image at the object.
20. The method of claim 19, including adjusting the imaging lens to adjust the selectable distance from the flashlight at which the uniform image is formed.
21. The method of claim 19, further comprising powering the light source with a battery.
22. The method of claim 19, wherein the uniform image has a boundary, and further comprising shaping the boundary by modifying the homogenized light exiting the homogenizer.
23. The method of claim 19, further comprising altering the light image exiting the output face to produce an image.
24. A flashlight that creates uniform illumination at a selectable distance from the flashlight, comprising:
    a light source connected to one or more batteries for powering the light source;
    a light homogenizer optically coupled to the light source and adapted to uniformize light from the light source and output uniformized light at an output face, wherein the light homogenizer is one selected from the group of light homogenizers comprising: (a) a light pipe, (b) a single lens array having two or more lenslets, and (c) a double lens array wherein each lens array in the double lens array includes two or more lenslets;
    an imaging lens adapted to receive the uniformized light and create a flashlight beam that forms an image of the output face at the selectable distance; and
    a hand-held housing that houses the light source, the one or more batteries, the light homogenizer, and the imaging lens.
25. The flashlight of claim 24, wherein the imaging lens is adjustable to adjust the flashlight beam in order to change the selectable distance.

* * * * *